(12) United States Patent
Katsuo

(10) Patent No.: US 8,402,169 B2
(45) Date of Patent: Mar. 19, 2013

(54) APPARATUS FOR TIME SYNCHRONIZING A NON-PCI COMPONENT OVER A PCI BUS

(75) Inventor: Satoshi Katsuo, Tokyo (JP)

(73) Assignee: Sony Corporation, Tokyo (JP)

( * ) Notice: Subject to any disclaimer, the term of this patent is extended or adjusted under 35 U.S.C. 154(b) by 1086 days.

(21) Appl. No.: 11/684,387

(22) Filed: Mar. 9, 2007

(65) Prior Publication Data
US 2007/0220101 A1  Sep. 20, 2007

(30) Foreign Application Priority Data
Mar. 17, 2006  (JP) .................................. 2006-074714

(51) Int. Cl.
G06F 15/16 (2006.01)
G06F 13/00 (2006.01)
G06F 13/42 (2006.01)

(52) U.S. Cl. ........ 709/248; 709/208; 710/100; 710/300; 710/301; 710/105; 710/306

(58) Field of Classification Search .................. 709/248, 709/208; 710/100, 300–301, 105, 305–306
See application file for complete search history.

(56) References Cited

U.S. PATENT DOCUMENTS

| | | | | |
|---|---|---|---|---|
| 5,689,688 | A * | 11/1997 | Strong et al. | 713/375 |
| 7,610,431 | B1 * | 10/2009 | Watkins et al. | 710/312 |
| 2001/0022536 | A1 * | 9/2001 | Kallio et al. | 331/1 R |
| 2003/0097503 | A1 * | 5/2003 | Huckins | 710/104 |
| 2003/0131206 | A1 * | 7/2003 | Atkinson et al. | 711/156 |
| 2004/0187044 | A1 * | 9/2004 | Barman et al. | 713/400 |
| 2005/0066220 | A1 * | 3/2005 | Gale et al. | 714/4 |
| 2007/0180173 | A1 * | 8/2007 | Jin et al. | 710/105 |
| 2008/0120007 | A1 * | 5/2008 | Lejeune et al. | 701/102 |

FOREIGN PATENT DOCUMENTS
JP  6-95678  11/1994

OTHER PUBLICATIONS

"PCI Local Bus Specification". Revision 3.0. PCI-SIG. Published: Feb. 3, 2004. <http://www.pcisig.com/specifications/conventional/>.*

Institute of Electrical and Electronics Engineers, Inc. IEEE Std 1394-1995. "IEEE Standard for a High Performance Serial Bus". ISBN: 1-55937-583-3. Published: 1996.*

* cited by examiner

Primary Examiner — Ashok Patel
Assistant Examiner — Kevin Bechtel
(74) Attorney, Agent, or Firm — Oblon, Spivak, McClelland, Maier & Neustadt, L.L.P.

(57) ABSTRACT

The information processing system includes a plurality of information processing apparatuses connected via a network. Each apparatus includes one or more modules interconnected via a system bus. At least one of the modules is a network module having a network communication function. The information processing apparatus that inputs an external timing signal functions as a timing master, and the other information processing apparatuses function as a timing slave. The module in the timing master generates time synchronization information in the form of a packet and in the form of a command according to the timing signal and transmits the command to another module and transmits the packet to the timing slave via the network. The network module in the timing slave receives the packet from the timing master, converts the packet to the command to transmit to another module connected to the system bus and included in the timing slave.

13 Claims, 9 Drawing Sheets

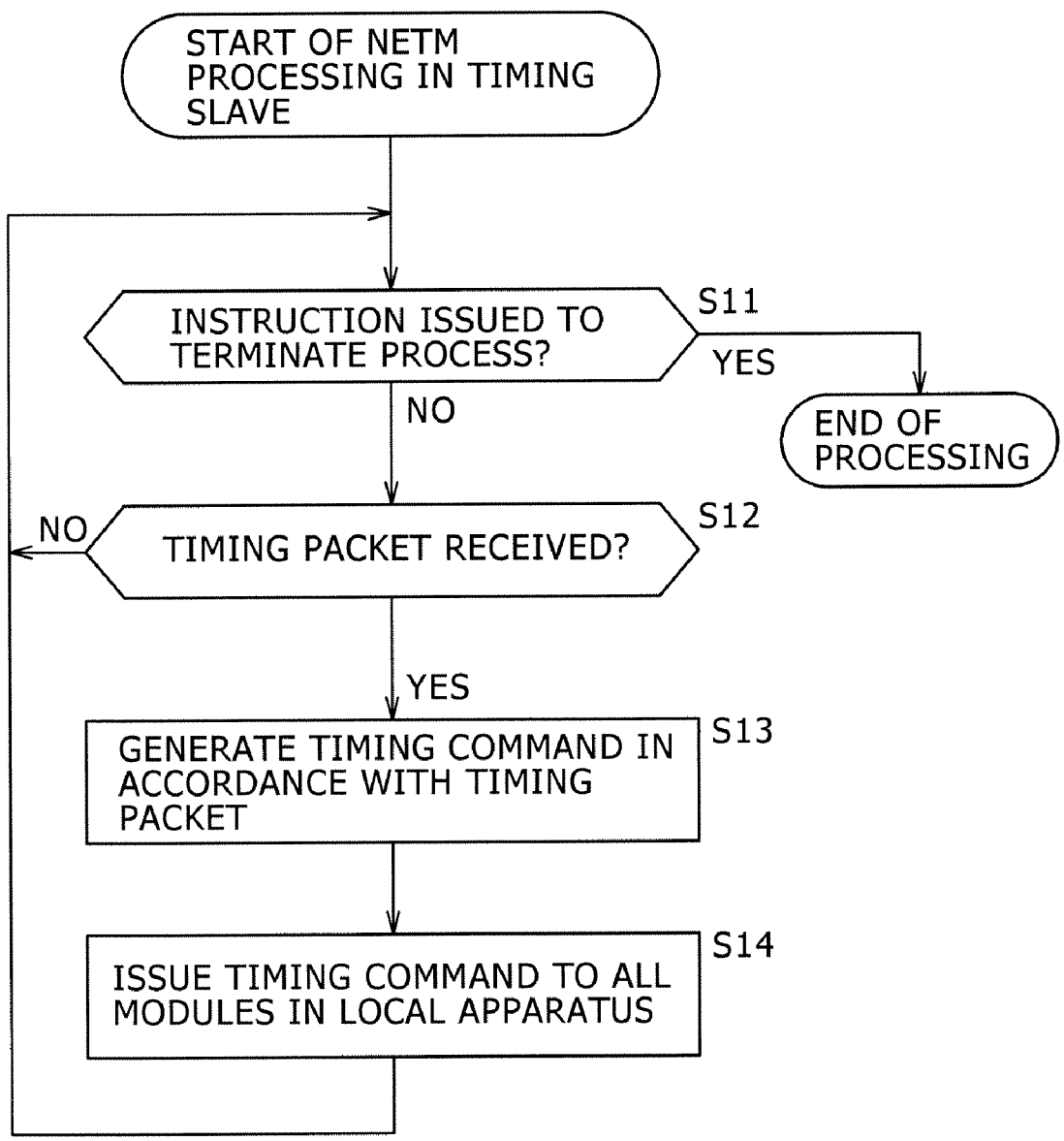

APPARATUS FOR TIME SYNCHRONIZING A NON-PCI COMPONENT OVER A PCI BUS

CROSS REFERENCES TO RELATED APPLICATIONS

The present invention contains subject matter related to Japanese Patent Application JP 2006-074714 filed in the Japanese Patent Office on Mar. 17, 2006, the entire contents of which being incorporated herein by reference.

BACKGROUND OF THE INVENTION

1. Field of the Invention

The present invention relates to an information processing system and method and an information processing apparatus, method, and program, and more particularly to an information processing system and method and an information processing apparatus, method, and program that are capable of providing timing synchronization between information processing apparatuses and synchronization between modules connected to a system bus and included in an information processing apparatus in a situation where the information processing system is composed of a plurality of network-connected information processing apparatuses.

2. Description of the Related Art

A method that is used in a system composed of a plurality of apparatuses connected to a LAN (Local Area Network) or other network for the purpose of providing timing synchronization between the plurality of apparatuses was formerly proposed, for instance, by Japanese Patent No. 1963910.

SUMMARY OF THE INVENTION

It is now demanded that timing synchronization be also provided between modules connected to a system bus and included in each of the plurality of apparatuses in the above-mentioned system. At present, however, such demand is not fully satisfied.

The present invention has been made under the above circumstances, and provides an information processing system and method and an information processing apparatus, method, and program that are capable of providing timing synchronization between information processing apparatuses and synchronization between modules connected to a system bus and included in an information processing apparatus in a situation where the information processing system is composed of a plurality of network-connected information processing apparatuses.

According to an embodiment of the present invention, there are provided an information processing system and an information processing method for use in the information processing system. The information processing system includes a plurality of information processing apparatuses that are connected via a network. Each information processing apparatus includes one or more modules that are interconnected via a system bus. At least one of the modules is a network module having a network communication function. An information processing apparatus that inputs an external timing signal functions as a timing master, and the other information processing apparatuses function as a timing slave. The network module in the timing master generates time synchronization information in the form of a packet and time synchronization information in the form of a command in accordance with the timing signal, transmits the command to another module connected to the system bus and included in the timing master, and transmits the packet to the timing slave via the network. The network module in the timing slave receives the packet from the timing master, converts the packet to the command, and transmits the command to another module connected to the system bus and included in the timing slave.

The information processing system and information processing method according to an embodiment of the present invention relate to an information processing system that includes a plurality of information processing apparatuses that are connected via a network, wherein each information processing apparatus includes one or more modules that are interconnected via a system bus, and wherein at least one of the modules is a network module having a network communication function. In such an information processing system, an information processing apparatus that inputs an external timing signal functions as a timing master, and the other information processing apparatuses function as a timing slave. In this instance, the network module in the timing master generates time synchronization information in the form of a packet and time synchronization information in the form of a command in accordance with the timing signal, transmits the command to another module connected to the system bus and included in the timing master, and transmits the packet to the timing slave via the network. Further, the network module in the timing slave receives the packet from the timing master, converts the packet to the command, and transmits the command to another module connected to the system bus and included in the timing slave.

A first information processing apparatus according to an embodiment of the present invention is one of a plurality of information processing apparatuses that are connected via a network to constitute an information processing system, wherein each information processing apparatus includes one or more modules that are interconnected via a system bus, and wherein at least one of the modules is a network module having a network communication function. The first information processing apparatus is an information processing apparatus that functions as a timing master in a situation where an information processing apparatus that inputs an external timing signal functions as a timing master, and the other information processing apparatuses function as a timing slave. The network module in the timing master includes a receiver that receives the timing signal; a packet generator that generates time synchronization information in the form of a packet in accordance with the timing signal received by the receiver and transmits the packet to the timing slave via the network; and a command generator that generates the time synchronization information in the form of a command in accordance with the timing signal received by the receiver and transmits the command to another module connected to the system bus and included in the timing master.

Each of the one or more modules includes a functional device that performs a predetermined function, and an interface device that uses a local interface to exchange information with the functional device and uses an interface conforming to the system bus to exchange information with the system bus. The functional device in the network module functions as the receiver, the packet generator, and the command generator.

A first information processing method according to an embodiment of the present invention is an information processing method for use in an information processing apparatus that is one of a plurality of information processing apparatuses connected via a network to constitute an information processing system, wherein each information processing apparatus includes one or more modules that are interconnected via a system bus, and wherein at least one of the modules is a network module having a network communication function. The first information processing method is for use in an information processing apparatus that functions as a timing master in a situation where an information processing apparatus that inputs an external timing signal functions as a timing master, and the other information processing apparatuses function as a timing slave. The first information processing method includes the step of causing the network module in the timing master to generate time synchronization information in the form of a packet and time synchronization information in the form of a command in accordance with the timing signal, transmit the command to another module connected to the system bus and included in the timing master, and transmit the packet to the timing slave via the network.

A first program according to an embodiment of the present invention is a program for the first information processing method according to an embodiment of the present invention, which is described above.

The first information processing apparatus, method, and program according to an embodiment of the present invention relate to one of a plurality of information processing apparatuses that are connected via a network to constitute an information processing system, wherein each information processing apparatus includes one or more modules that are interconnected via a system bus, and wherein at least one of the modules is a network module having a network communication function. The first information processing apparatus, method, and program relate to an information processing apparatus that functions as a timing master in a situation where an information processing apparatus that inputs an external timing signal functions as a timing master, and the other information processing apparatuses function as a timing slave. The network module in the timing master generates time synchronization information in the form of a packet and time synchronization information in the form of a command in accordance with the timing signal, transmits the command to another module connected to the system bus and included in the timing master, and transmits the packet to the timing slave via the network.

A second information processing apparatus according to an embodiment of the present invention is one of a plurality of information processing apparatuses that are connected via a network to constitute an information processing system, wherein each information processing apparatus includes one or more modules that are interconnected via a system bus, and wherein at least one of the modules is a network module having a network communication function. The second information processing apparatus functions as a timing slave in a situation where an information processing apparatus that generates time synchronization information in the form of a packet in accordance with an external timing signal and transmits the generated packet to the network functions as a timing master, and the other information processing apparatuses function as a timing slave. The network module in the timing slave includes a receiver that receives the packet from the timing master via the network and a command generator that converts the packet received by the receiver to the command and transmits the command to another module connected to the system bus and included in the timing slave.

Each of the one or more modules includes a functional device that performs a predetermined function, and an interface device that uses a local interface to exchange information with the functional device and uses an interface conforming to the system bus to exchange information with the system bus. The functional device in the network module functions as the receiver and the command generator.

A second information processing method according to an embodiment of the present invention is an information processing method for use in an information processing apparatus that is one of a plurality of information processing apparatuses connected via a network to constitute an information processing system, wherein each information processing apparatus includes one or more modules that are interconnected via a system bus, and wherein at least one of the modules is a network module having a network communication function. The second information processing method is for use in an information processing apparatus that functions as a timing slave in a situation where an information processing apparatus that generates time synchronization information in the form of a packet in accordance with an external timing signal and transmits the generated packet to the network functions as a timing master, and the other information processing apparatuses function as a timing slave. The second information processing method includes the step of causing the network module in the timing slave to receive the packet from the timing master via the network, convert the packet to the command, and transmit the command to another module connected to the system bus and included in the timing slave.

A second program according to an embodiment of the present invention is a program for the second information processing method according to an embodiment of the present invention, which is described above.

The second information processing apparatus, method, and program according to an embodiment of the present invention relate to one of a plurality of information processing apparatuses that are connected via a network to constitute an information processing system, wherein each information processing apparatus includes one or more modules that are interconnected via a system bus, and wherein at least one of the modules is a network module having a network communication function. The second information processing apparatus, method, and program relate to an information processing apparatus that functions as a timing slave in a situation where an information processing apparatus that generates time synchronization information in the form of a packet in accordance with an external timing signal and transmits the generated packet to the network functions as a timing master, and the other information processing apparatuses function as a timing slave. The network module in the timing slave receives the packet from the timing master via the network, converts the packet to the command, and transmits the command to another module connected to the system bus and included in the timing slave.

As described above, the present invention can provide timing synchronization between a plurality of network-connected apparatuses that constitute a system. In addition to timing synchronization between the plurality of apparatuses, the present invention can also provide timing synchronization between modules connected to a system bus and included in each apparatus.

BRIEF DESCRIPTION OF THE DRAWINGS

FIG. 10 is a flowchart illustrating an example of a process that the NETM shown in FIG. 8 performs in a timing slave.

DETAILED DESCRIPTION OF THE PREFERRED EMBODIMENT

An embodiment of the present invention will now be described. The relationship between constituent features indicated by the appended claims and specific examples described in this document or depicted in the accompanying drawings is exemplified below. This statement verifies that the specific examples supporting the invention described in the claims are described in this document or depicted in the accompanying drawings. Therefore, even if a specific example is not described here as a specific example that corresponds to the constituent features although the specific example is described in this document or depicted in the accompanying drawings, it does not mean that the specific example does not correspond to the constituent features. Conversely, even if the specific example is described here as a specific example that corresponds to the constituent features, it does not mean that the specific example does not correspond to the other constituent features.

Further, the following description does not signify that the invention corresponding to the specific examples described in this document or depicted in the accompanying drawings is entirely described in the claims. In other words, the following description does not deny the presence of an invention that corresponds to the specific examples described in this document or depicted in the accompanying drawings but is not indicated by the claims, that is, the description does not deny the presence of an invention that may be filed in the future for divisional patent application or for addition to the present patent application as a result of later amendment to the claims.

Figure 1:
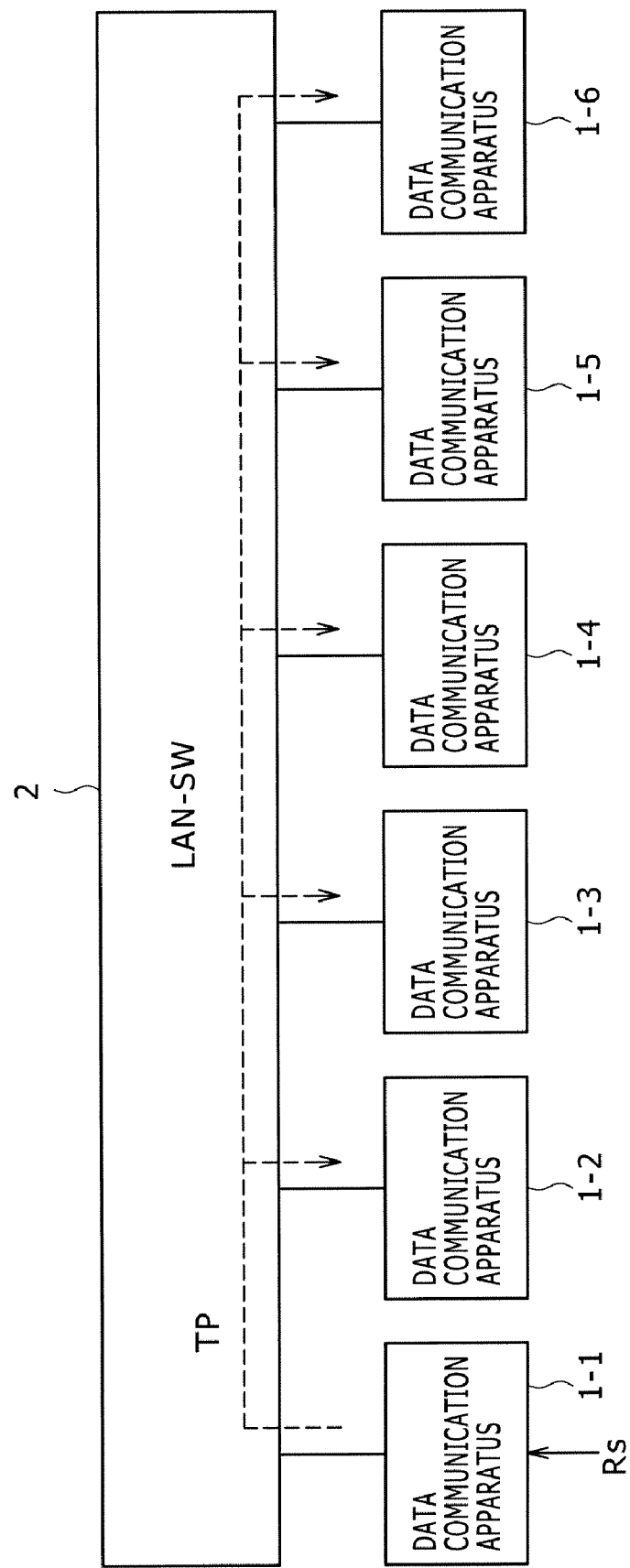
FIG. 1 is a block diagram illustrating a typical configuration of an information processing system according to an embodiment of the present invention.

The information processing system according to an embodiment of the present invention (e.g., an information processing system 1 in FIG. 1) includes a plurality of (e.g., six units in an example in FIG. 1) information processing apparatuses (e.g., data communication apparatuses 1-1 to 1-6 in FIG. 1) that are connected via a network (e.g., a local area network (LAN-SW) 2 in FIG. 1). Each information processing apparatus (e.g., a data communication apparatus 1 in FIG. 2) includes one or more modules (a controller 11, an audio video module (AVM) 12-2, and a storage device module (SDM) 12-3 in FIG. 2) that are interconnected via a system bus (e.g., a general-purpose system bus 41 in FIG. 2). At least one of the modules is a network module (e.g., an NETM 12-1 in FIG. 2) having a network communication function. An information processing apparatus (e.g., a data communication apparatus 1-1 in FIG. 1 or 6) that inputs an external timing signal (e.g., a timing signal Rs in FIG. 1 or 6) functions as a timing master, and the other information processing apparatuses (e.g., data communication apparatuses 1-2 to 1-6 in FIG. 1 or 6) function as a timing slave. The network module in the timing master generates time synchronization information in the form of a packet (e.g., a timing packet TP in FIG. 6) and time synchronization information in the form of a command (e.g., a timing command TC in FIG. 6) in accordance with the timing signal, transmits the command to another module connected to the system bus and included in the timing master, and transmits the packet to the timing slave via the network (refer, for instance, to the data communication apparatus 1-1 in FIG. 6). The network module in the timing slave receives the packet from the timing master, converts the packet to the command, and transmits the command to another module connected to the system bus and included in the timing slave (refer, for instance, to the data communication apparatus 1-2 in FIG. 6).

The information processing method according to an embodiment of the present invention is an information processing method for use in the information processing system according to an embodiment of the present invention, which is described above. The information processing method includes the steps of causing the network module in the timing master to generate time synchronization information in the form of a packet and time synchronization information in the form of a command in accordance with the timing signal (e.g., step S3 in FIG. 9), transmit the command to another module connected to the system bus and included in the timing master, and transmit the packet to the timing slave via the network (e.g., step S4 in FIG. 9), and causing the network module in the timing slave to receive a packet from the timing master (e.g., step S12 YES in FIG. 10), convert the packet to the command (e.g., step S13 in FIG. 10), and transmit the command to another module connected to the system bus and included in the timing slave (e.g., step S14 in FIG. 10).

The first information processing apparatus according to an embodiment of the present invention is one of a plurality of (e.g., six units in an example in FIG. 1) information processing apparatuses (e.g., data communication apparatuses 1-1 to 1-6 in an example in FIG. 1) that are connected via a network (data communication apparatuses 1-1 to 1-6 in an example in FIG. 1) to constitute an information processing system, wherein each information processing apparatus (e.g., a data communication apparatus 1 in FIG. 2) includes one or more modules (e.g., a controller 11, an AVM 12-2, and an SDM 12-3 in FIG. 2) that are interconnected via a system bus (e.g., a general-purpose system bus 41 in FIG. 2), and wherein at least one of the modules is a network module (e.g., an NETM 12-1 in FIG. 2) having a network communication function. The first information processing apparatus is an information processing apparatus that functions as a timing master in a situation where an information processing apparatus that inputs an external timing signal (e.g., a timing signal Rs in FIG. 1 or 6) functions as a timing master, and the other information processing apparatuses (e.g., data communication apparatuses 1-2 to 1-6 in FIG. 1 or 6) function as a timing slave. The network module (e.g., an NETM 12-11 in FIG. 7) in the timing master includes a receiver (e.g., a timing signal reception section 111 in FIG. 7) that receives the timing signal; a packet generator (e.g., a timing packet generation section 112 in FIG. 7) that generates time synchronization information in the form of a packet in accordance with the timing signal received by the receiver and transmits the packet to the timing slave via the network; and a command generator (e.g., a timing command generation section 113 in FIG. 7) that generates the time synchronization information in the form of a command in accordance with the timing signal received by the receiver and transmits the command to another module connected to the system bus and included in the timing master.

Each of the one or more modules (e.g., a controller 11 and modules 12-1 to 12-3 in FIG. 2) includes a functional device (e.g., a functional device 51-11, 51-21, 51-22, or 51-23 in FIG. 2) that performs a predetermined function, and an interface device (e.g., an interface device 52-11, 52-21, 52-22, or 52-23 in FIG. 2) that uses a local interface to exchange information with the functional device and uses an interface conforming to the system bus to exchange information with the system bus. The functional device in the network module functions as the receiver, the packet generator, and the command generator.

The first information processing method according to an embodiment of the present invention is an information processing method for the first information processing apparatus according to an embodiment of the present invention, which is described above. The first information processing method includes the step of causing the network module in the timing master to generate time synchronization information in the form of a packet and time synchronization information in the form of a command in accordance with the timing signal (e.g., step S3 in FIG. 9), transmit the command to another module connected to the system bus and included in the timing master, and transmit the packet to the timing slave via the network (e.g., step S4 in FIG. 9).

The first program according to an embodiment of the present invention is a program for the first information processing method according to an embodiment of the present invention.

The second information processing apparatus according to an embodiment of the present invention is one of a plurality of (six units in an example in FIG. 1) information processing apparatuses (data communication apparatuses 1-1 to 1-6 in an example in FIG. 1) that are connected via a network (data communication apparatuses 1-1 to 1-6 in an example in FIG. 1) to constitute an information processing system, wherein each information processing apparatus (e.g., a data communication apparatus 1 in FIG. 2) includes one or more modules (e.g., a controller 11, an AVM 12-2, and an SDM 12-3 in FIG. 2) that are interconnected via a system bus (e.g., a general-purpose system bus 41 in FIG. 2), and wherein at least one of the modules is a network module (e.g., an NETM 12-1 in FIG. 2) having a network communication function. The second information processing apparatus functions as a timing slave in a situation where an information processing apparatus (e.g., a data communication apparatus 1-1 in FIG. 1 or 6) that generates time synchronization information in the form of a packet (e.g., a timing packet TP in FIG. 1 or 6) in accordance with an external timing signal (e.g., a timing signal Rs in FIG. 1 or 6) and transmits the generated packet to the network functions as a timing master, and the other information processing apparatuses (e.g., data communication apparatuses 1-2 to 1-6 in FIG. 1 or 6) function as a timing slave. The network module (e.g., an NETM 12-21 in FIG. 8) in the timing slave includes a receiver (e.g., a timing packet reception section 114 in FIG. 8) that receives the packet from the timing master via the network and a command generator (e.g., a timing command generation section 113 in FIG. 8) that converts the packet received by the receiver to the command and transmits the command to another module connected to the system bus and included in the timing slave.

Each of the one or more modules (e.g., a controller 11 and modules 12-1 to 12-3 in FIG. 2) includes a functional device (e.g., a functional device 51-11, 51-21, 51-22, or 51-23 in FIG. 2) that performs a predetermined function, and an interface device (e.g., an interface device 52-11, 52-21, 52-22, or 52-23 in FIG. 2) that uses a local interface to exchange information with the functional device and uses an interface conforming to the system bus to exchange information with the system bus. The functional device in the network module functions as the receiver and the command generator.

The second information processing method according to an embodiment of the present invention is an information processing method for the second information processing apparatus according to an embodiment of the present invention, which is described above. The second information processing method includes the step of causing the network module in the timing slave to receive the packet from the timing master via the network (e.g., step S12 YES in FIG. 10), convert the packet to the command (e.g., step S13 in FIG. 10), and transmit the command to another module connected to the system bus and included in the timing slave (e.g., step S14 in FIG. 10).

The second program according to an embodiment of the present invention is a program for the second information processing method according to an embodiment of the present invention, which is described above.

An embodiment of the present invention will now be described with reference to the accompanying drawings.

FIG. 1 shows an example illustrating the configuration of an information processing system according to an embodiment of the present invention.

The example in FIG. 1 indicates that the information processing system includes six data communication apparatuses 1-1 to 1-6, which are connected by a LAN switch 2 (hereinafter referred to as the LAN-SW 2). More specifically, the data communication apparatuses 1-1 to 1-6 are interconnected via a LAN that is an asynchronous network.

However, the number of data communication apparatuses connected to the LAN-SW 2 is not limited to six as indicated in the example in FIG. 1. Any number of data communication apparatuses can be connected to the LAN-SW 2.

The data communication apparatus 1-1 inputs a predetermined timing signal Rs from the outside, generates time synchronization information for setting up a common data transmission/reception schedule within the information processing system in the form of a packet (this packet is hereinafter referred to as the timing packet TP) in accordance with the timing signal Rs, and transmits the packet to the data communication apparatuses 1-2 to 1-6 by multicast or broadcast communication.

All data communication apparatuses 1-1 to 1-6 then share the same time information and can transmit/receive various data packets in accordance with a common data transmission/reception schedule.

Further, all data communication apparatuses 1-1 to 1-6 generate time synchronization information in the form of a command (this command is hereinafter referred to as the timing command TC) at the time of timing packet transmission or reception, and transmit the command to internal modules that are connected to a system bus. The modules in all data communication apparatuses 1-1 to 1-6 then share the same time information and can perform operations in accordance with the same timing reference. The modules, timing command TC, and the like will be described in detail later with reference to FIG. 2 and the subsequent drawings.

As described above, the data communication apparatus 1-1, which is shown in the example in FIG. 1, is an apparatus (hereinafter referred to as a timing master) that obtains time synchronization information from the external timing signal Rs and transmits the timing packet TP corresponding to the obtained time synchronization information. On the other hand, the data communication apparatuses 1-2 to 1-6 are an apparatus (hereinafter referred to as a timing slave) that receives the timing packet TP from an asynchronous network and obtains the time synchronization information from the received timing packet TP.

However, the data communication apparatuses 1-2 to 1-6 can also function as a timing master if they input the timing signal Rs, and the data communication apparatus 1-1 can function as a timing slave. In other words, the data communication apparatuses 1-1 to 1-6 can function as a timing master or as a timing slave. When a data communication apparatus inputs the timing signal Rs, it functions as a timing master. If not, it functions as a timing slave.

Figure 2:
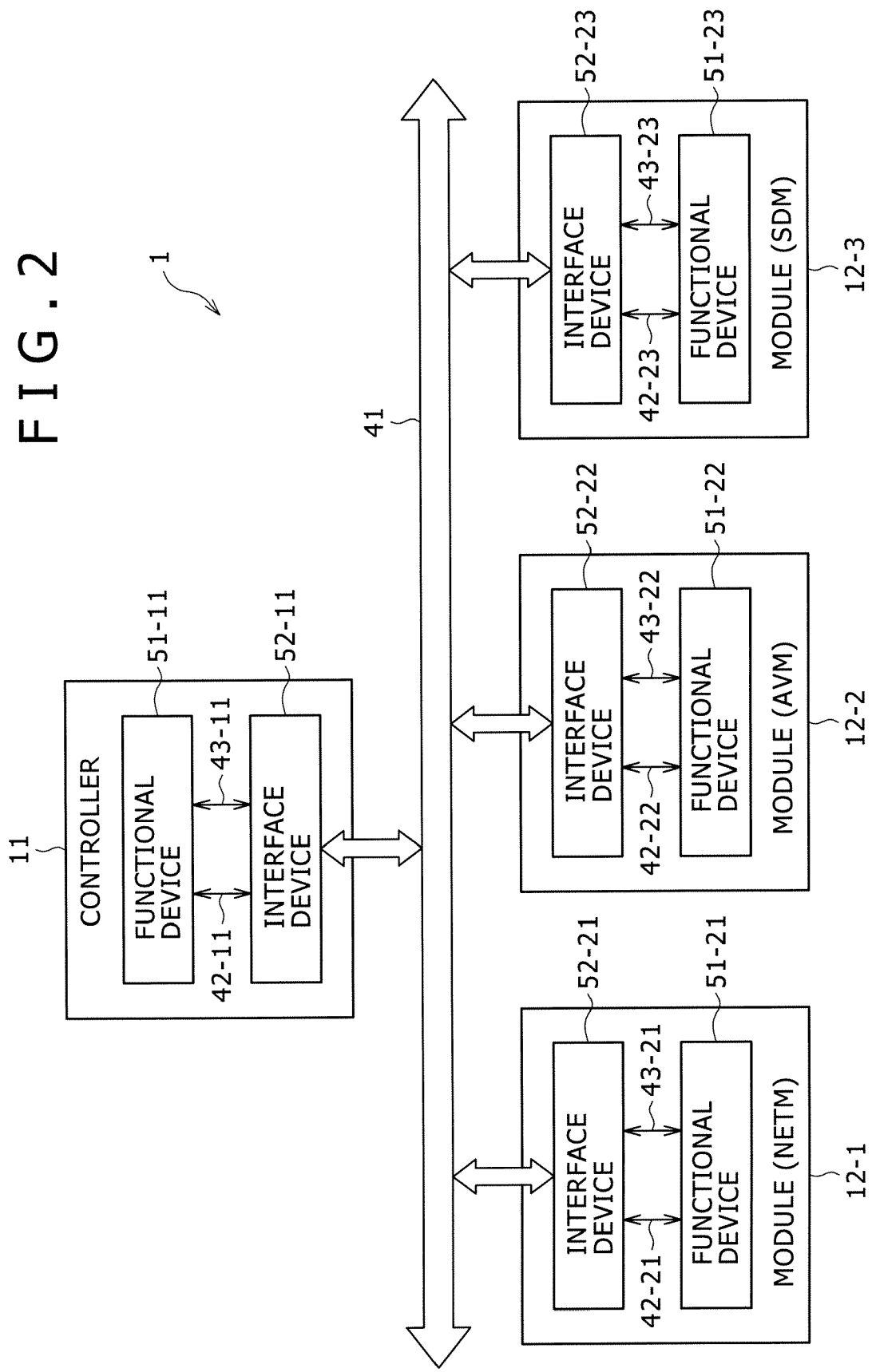
FIG. 2 is a block diagram illustrating a typical hardware configuration of a data communication apparatus that is a part of the information processing system shown in FIG. 1.

In this document, therefore, each of the data communication apparatuses 1-1 to 1-6 is hereinafter referred to as a data communication terminal 1 if they do not have to be distinguished from each other. FIG. 2 shows an example illustrating the configuration of a data communication terminal 1.

The example in FIG. 2 indicates that the data communication apparatus 1 includes a controller 11 and modules 12-1 to 12-3. These four modules (the controller 11 is also counted as a module) are interconnected via a general-purpose system bus 41.

Each module is a unit of elemental technology for designing the basic structure of a product (the data communication apparatus 1 in the present embodiment). The designer or other relevant personnel may freely define what technological levels that the elemental technology includes. In other words, when the basic structure of a product is to be designed, the designer or other relevant personnel should uniquely determine the functions to be incorporated into the product and use his/her discretion in classifying the functions into the categories of one or more elemental technologies. As regards a module corresponding to a predetermined elemental technology, the designer or other relevant personnel should carry out design and production work so that the module incorporates the functions classified into the category of the predetermined elemental technology.

In the example in FIG. 2, the modules are configured (designed and produced) as described below.

The module 12-1 is configured as a network device module (hereinafter referred to as the NETM). The NETM is a module that exercises network functions, that is, incorporates various functions for communicating with another data communication apparatus 1 via the LAN-SW 2 (FIG. 1) in the present embodiment.

The module 12-2 is configured as an audio and visual device module (hereinafter referred to as the AVM). The AVM is a module that performs audio/video (AV) recording/reproduction operations, that is, performs various AV signal processing operations such as encoding AV signals and decoding encoded AV signals.

The module 12-3 is configured as a storage device module (hereinafter referred to as the SDM). The SDM is a module that controls a hard disk drive (HDD), optical disk, tape, or other storage device, that is, incorporates functions, for instance, for reading and writing data on a storage device.

The controller 11 is also a module that exercises overall control over the data communication apparatus 1.

The example in FIG. 2 indicates that the data communication apparatus 1 includes four modules. However, the number of modules included in the data communication apparatus 1 is not limited to the example shown in FIG. 2.

In the present embodiment, the general-purpose system bus 41 is configured as a PCI Express (trademark) bus. It goes without saying that a PCI (trademark) or other general-purpose bus may be employed as the general-purpose system bus 41. In such a case, however, each module is provided with an interface device that is suitable for the employed general-purpose bus, as described later.

The four modules, namely, the controller 11, NETM 12-1, AVM 12-2, and SDM 12-3, will be described in detail below.

The controller 11 includes a functional device 51-11 and an interface device 52-11. These devices are interconnected via a message bus 42-11 and a data bus 43-11.

The modules 12-1 to 12-3 are configured basically the same as the controller 11. More specifically, the module 12-1 includes a functional device 51-21 and an interface device 52-21, which are interconnected via a message bus 42-21 and a data bus 43-21; the module 12-2 includes a functional device 51-22 and an interface device 52-22, which are interconnected via a message bus 42-22 and a data bus 43-22; and the module 12-3 includes a functional device 51-23 and an interface device 52-23, which are interconnected via a message bus 42-23 and a data bus 43-23.

When the functional devices 51-11, 51-21, 51-22, and 51-23 do not have to be distinguished from each other, they will be generically referred to as a functional device 51. Similarly, when the interface devices 52-11, 52-21, 52-22, and 52-23 do not have to be distinguished from each other, they will be generically referred to as an interface device 52. Accordingly, the message buses 42-11, 42-21, 42-22, and 42-23 will be generically referred to as a message bus 42; and the data buses 43-11, 43-21, 43-22, and 43-23 will be generically referred to as a data bus 43.

Namely, each module in the present embodiment includes a functional device 51 and an interface device 52, which are interconnected via a message bus 42 and a data bus 43.

As the interface for the functional device 51 and interface device 52, a local interface having the message bus 42 and data bus 43 is employed. In other words, the message bus 42 and data bus 43 are local buses that conform to such a local interface.

Therefore, it may be simply required that each functional device 51 conform to the above-mentioned local interface. Configuration can be achieved without paying attention to PCI Express.

The message bus 42 is configured, for instance, as a 32-bit static random access memory or synchronous static random access memory (SRAM/SSRAM) compatible target. It is designed on the presumption that it is connected to a CPU. In the present embodiment, therefore, messages (e.g., the aforementioned timing command TC) exchanged between the CPUs for the functional devices 51 are transmitted by the message bus 42.

On the other hand, the data bus 43 is configured as a 64-bit direct memory access (DMA) master/target. It is designed on the presumption that it is connected to hardware. Therefore, when, in the present embodiment, various settings are defined by messages exchanged between the CPUs for the functional devices 51, data (e.g., AV data) exchanged between various units of hardware for the functional devices 51 is transmitted by the data bus 43.

In other words, the message bus 42 operates as if the CPUs for the functional devices are connected via a dual ported random access memory (DPRAM), and the data bus 43 operates as if various units of hardware for the functional devices are directly coupled by DMA.

The functional device 51 conforming to the local interface as described above can be configured as described below.

Figure 3:
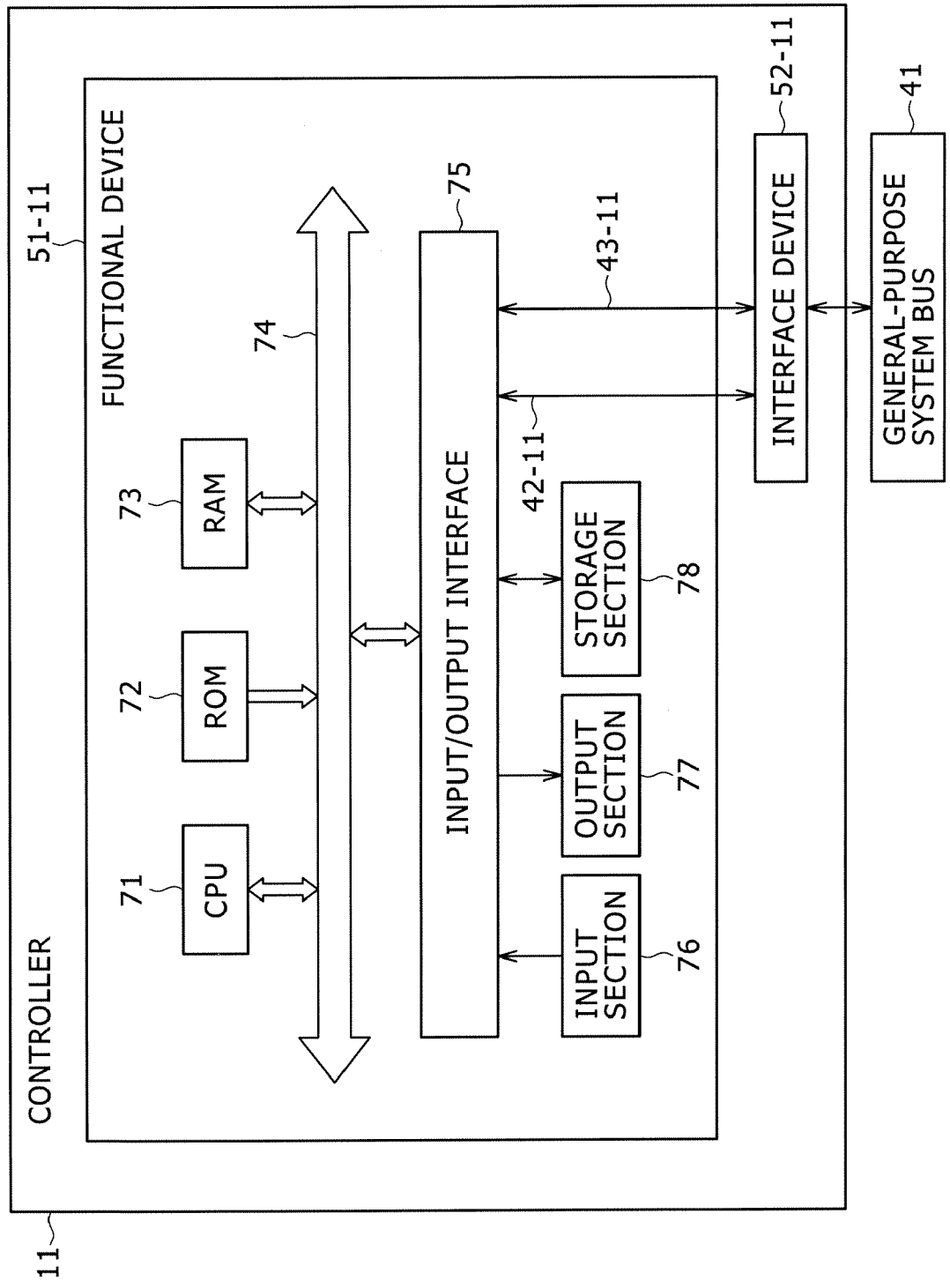
FIG. 3 is a block diagram illustrating in detail a typical hardware configuration of a functional device of a controller in the data communication apparatus shown in FIG. 2.

For example, the functional device 51-11 for the controller 11 can be configured as shown in FIG. 3.

In the functional device 51-11 shown in the example in FIG. 3, a CPU (Central Processing Unit) 71 performs various processes in accordance with a program stored in an ROM (Read Only Memory) 72 or with a program that is loaded into a RAM (Random Access Memory) 73 from a storage section 78. The RAM 73 also stores the data that is necessary when the CPU 71 performs various processes accordingly.

The CPU 71, ROM 72, and RAM 73 are interconnected via a bus 74. The bus 74 is also connected to an input/output interface 75.

The input/output interface 75 is connected to an input section 76, which includes, for instance, a keyboard and a mouse; an output section 77, which includes, for instance, a display; and a storage section 78, which includes, for instance, a hard disk.

The input/output interface 75 is also connected to the interface device 52-11 via the message bus 42-11 and data bus 43-11. In other words, the input/output interface 75 conforms to the above-mentioned local interface.

The interface device 52-11 will be described in detail later with reference to FIG. 5.

In the present embodiment, the module 12-1, which is shown in FIG. 2, is configured as the NETM. Therefore, the functional device 51-21 included in the NETM can be configured as shown in FIG. 4.

Figure 4:
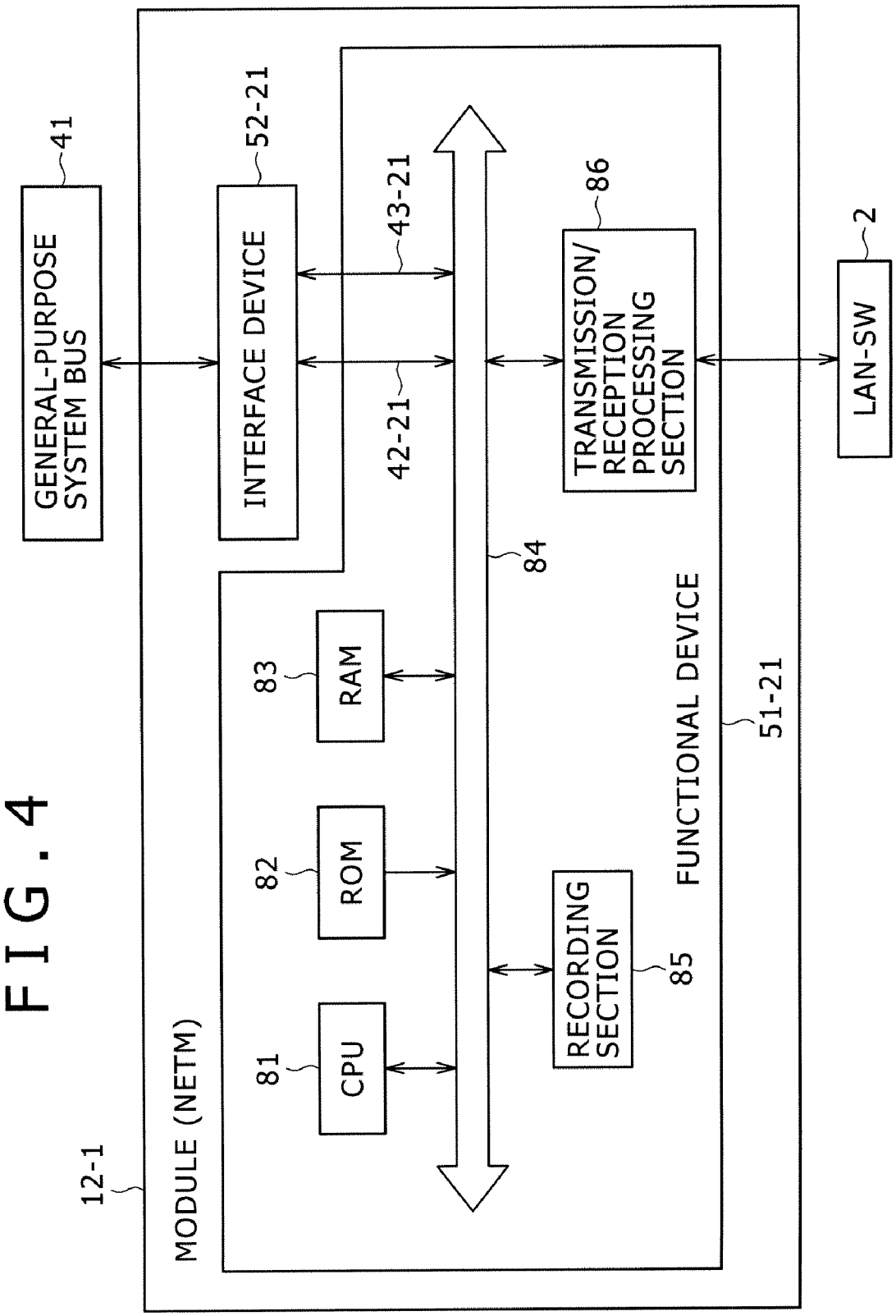
FIG. 4 is a block diagram illustrating in detail a typical hardware configuration of a functional device of a network module (NETM) in the data communication apparatus shown in FIG. 2.

The functional device 51-21 shown in the example in FIG. 4 receives information (data and messages) from the general-purpose system bus 41 via the interface device 52-21 and transmits it to another data communication apparatus 1 via the LAN-SW 2 or receives information from another data communication apparatus 1 and supplies it to the general-purpose system bus 41 via the interface device 52-21. The functional device 51-21 also performs TCP/IP (Transmission Control Protocol/Internet Protocol) or other protocol stack processing (a predetermined process concerning a protocol stack).

The functional device 51-21 includes a CPU 81, a ROM 82, a RAM 83, a recording section 85, and a transmission/reception processing section 86. The CPU 81, ROM 82, RAM 83, recording section 85, and transmission/reception processing section 86 are interconnected via a bus 84.

The CPU 81 performs various processes in accordance with a program stored in the ROM 82 or with a program that is loaded into the RAM 83 from the recording section 85. The RAM 83 also stores the data that is necessary when the CPU 81 performs various processes accordingly.

Under the control of the CPU 81, the transmission/reception processing section 86 performs, for instance, a predetermined process for transmitting information to another data communication apparatus 1 via the LAN-SW 2 or receiving information from another data communication apparatus 1 (not shown) via the LAN-SW 2.

The bus 84 is also connected to the interface device 52-21 via the message bus 42-21 and data bus 43-21. In other words, the bus 84 conforms to the aforementioned local interface.

As described above, the functional device 51-21 conforms to the local interface for communicating with the interface device 52-21, and has a hardware configuration that is necessary for allowing the module 12-1 to function as the NETM.

Similarly, the functional device 51-22 for the module 12-2 shown in FIG. 2, which is not depicted in a figure, conforms to the local interface for communicating with the interface device 52-22, and has a hardware configuration that is necessary for allowing the module 12-2 to function as the AVM. Further, the functional device 51-23 for the module 12-3, which is not depicted in a figure, also conforms to the local interface for communicating with the interface device 52-23, and has a hardware configuration that is necessary for allowing the module 12-3 to function as the SDM.

As described above, the functional device 51 for each module is designed in conformity with the local interface (the local interface having the message bus 42 and data bus 43). Therefore, even when the general-purpose system bus 41 is changed to a bus other than a PCI Express bus, the intended purpose is achieved simply by changing the interface device 52 that is commonly used by each module. In other words, each functional device 51 do not have to be changed at all.

Figure 5:
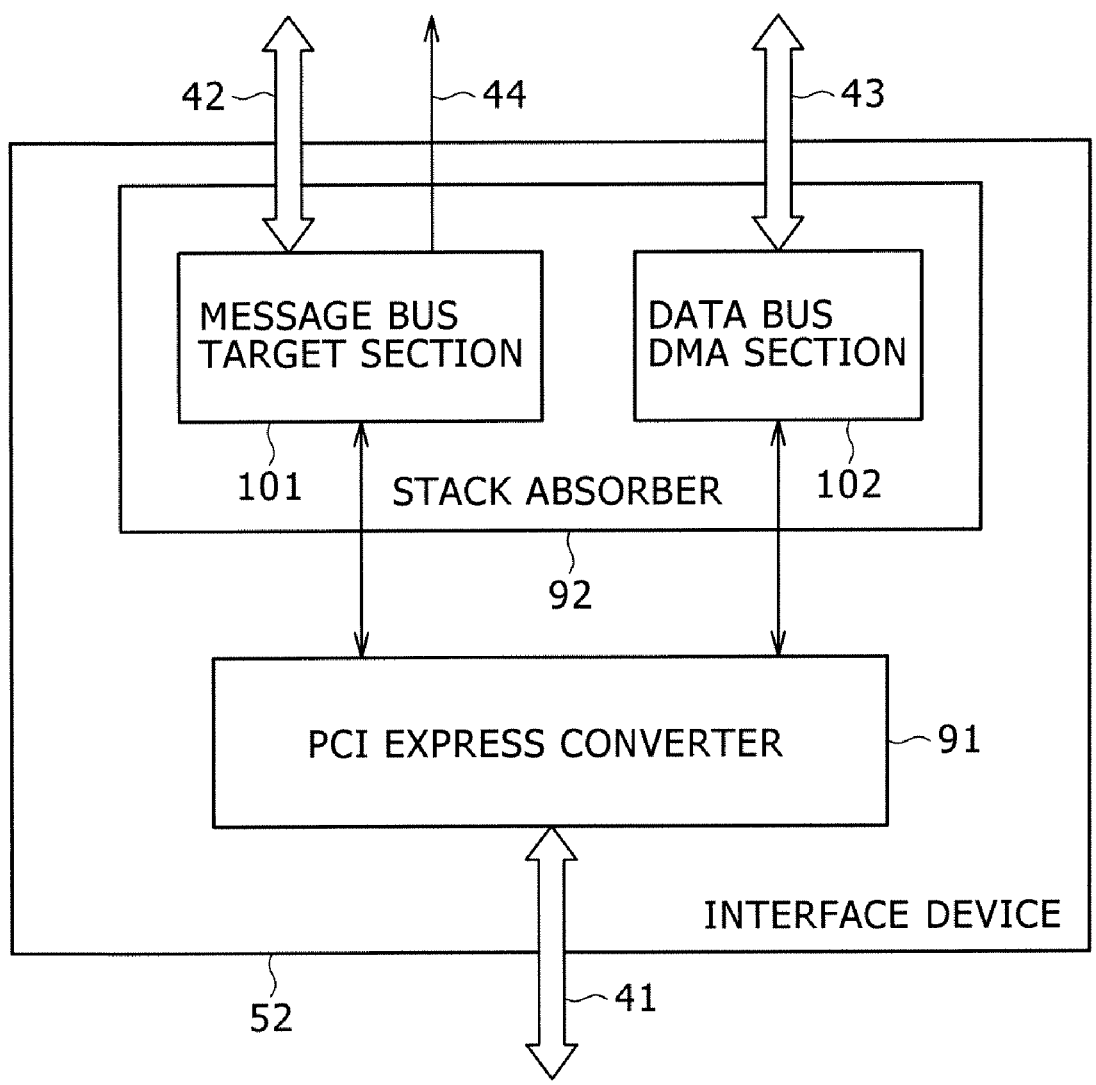
FIG. 5 is a block diagram illustrating in detail a typical hardware configuration of an interface device in the data communication apparatus shown in FIG. 2.

FIG. 5 shows an example illustrating how the interface device 52 is configured when a PCI Express bus is employed as the general-purpose system bus 41.

The example in FIG. 5 indicates that the interface device 52 includes a PCI Express converter 91 and a stack absorber 92.

The PCI Express converter 91 is connected to the PCI Express bus, which serves as the general-purpose system bus 41, and to the stack absorber 92. In other words, the PC Express converter 91 of one module is connected to the PCI Express converter 91 of another module via the PCI Express bus (general-purpose system bus 41).

The stack absorber 92 includes a message bus target section 101 and a data bus DMA section 102.

The message bus target section 101 is not only connected to the aforementioned PCI Express converter 91, but also connected to the functional device 51 (the CPU in the functional device) of the local module via the message bus 42 and an interrupt line 44. The interrupt line 44 will be described later.

The data bus DMA section 102 is not only connected to the aforementioned PCI Express converter 91, but also connected to the functional device 51 (the hardware in the functional device) of the local module via the data bus 43.

A typical operation of the interface device 52 that is configured as described above will now be described.

For example, when a message is output from the functional device 51 of the local module, it is written on the message bus target section 101 via the message bus 42 in a format that conforms to the message bus 42, and supplied to the PCI Express converter 91. The PCI Express converter 91 then converts the data format of the message to a format conforming to PCI Express (a format for permitting transmission on the general-purpose system bus 41), and transmits the message to a transmission destination module (to the interface device 52 in the transmission destination module) via the general-purpose system bus 41, which serves as a PCI Express bus.

For example, the format conforming to PCI Express is a TLP (Transaction Layer Packet).

On the other hand, when data is output from the functional device 51 of the local module, it is written on the data bus DMA section 102 via the data bus 43 in a format that conforms to the data bus 43. The data written on the data bus DMA section 102 is supplied to the PCI Express converter 91. The PCI Express converter 91 then converts the format of the data from the format conforming to the data bus 43 to a TLP format or other format conforming to PCI Express, and transmits the data to a transmission destination module (to the interface device 52 in the transmission destination module) via the general-purpose system bus 41, which serves as a PCI Express bus.

As described above, the PCI Express converter 91 in the interface device 52 for the transmission destination module receives the data or message, as the data (e.g., a TLP) conforming to PCI Express, via the general-purpose system bus 41, which serves as a PCI Express bus.

The PCI Express converter 91 then judges in accordance with the address of the TLP whether the TLP is a message or data.

If the judgment result indicates that the TLP is data, the PCI Express converter 91 converts the TLP to data conforming to the data bus 43 and supplies the data to the data bus DMA section 102. The data bus DMA section 102 then supplies the data to the functional device 51 in the local module (transmission destination module) via the data bus 43.

If, on the other hand, the judgment result indicates that the TLP is a message, the PCI Express converter 91 converts the TLP to a message conforming to the message bus 42, and supplies the message to the message bus target section 101. The message bus target section 101 then supplies the message to the functional device 51 in the local module (transmission destination module) via the message bus 42.

The message bus 42 has a target function only. Therefore, when a message is output, the message bus target section 101 asserts an interrupt signal, which is supplied through the interrupt line 44, so that the functional device 51 in the local module performs a read via the message bus 42.

A data transfer from the interface device 52 in one module to the interface device 52 in another module is made via the PCI Express bus (general-purpose system bus 41).

In the above instance, the data transfer is defined as a memory copy in a PCI address space. Further, the data transfer is made to an address that is written as an argument for a transmission/reception request (e.g., send/recv request), which is included in a message handled via the message bus 42. The PCI Express interface, which is described above, supports multiple data transfer.

Since the functional devices 51 are interconnected via the interface devices 52, which perform the above operation, the functional devices 51 perform the following operation.

The CPUs for the functional devices 51 exchange messages to determine the functional device 51 targeted for communication. In this instance, the CPUs for the functional devices 51 are handled by the message buses 42 as if they are connected via a DPRAM. From the viewpoint of the functional devices 51, therefore, messages are exchanged in a format that conforms to the message buses 42. In this instance, the communication destination can be determined in accordance with the contents of a header area in a message.

When the communication destination is determined as described above, the hardware in each functional device 51 exchanges data with the hardware in the functional device 51 at the communication destination. In this instance, each data bus 43 operates as if various units of hardware for the functional devices 51 are directly coupled by DMA as described earlier. From the viewpoint of the functional devices 51, therefore, the data is directly exchanged between various units of hardware in a format that conforms to the data buses 43.

When, for instance, a format that involves an address phase and data phase is employed as a format conforming to the data bus 43, the communication destination can be determined simply by exchanging data formatted as described above via the data buses 43 and without exchanging messages via the message bus 42.

As described above, the modules (e.g., controller 11 and modules 12-1 to 12-3 in FIG. 2) to which the present invention is applied are less dependent on a general-purpose bus than before. The modules to which the present invention is applied include the functional device 51 and interface device 52. Only the interface device 52 is dependent on the general-purpose bus (general-purpose system bus 41), and the functional device 51 is not dependent on the general-purpose bus (general-purpose system bus 41).

Therefore, even when the bus to be employed as the general-purpose system bus 41 for the data communication apparatus 1 shown in FIG. 2 is changed due to a change in the trend in the general-purpose bus, the changed bus can be complied with simply by changing (replacing or modifying) the interface device 52. There is no need to change (replace or modify) the functional device 51.

Further, the functional device 51 conforming to the local bus is used as a common module because it can be adapted to various general-purpose interfaces. This provides enhanced product design efficiency.

Furthermore, the information processing apparatus can be configured by directly connecting two or more functional devices 51 without connecting to the general-purpose system bus 41.

A timing synchronization operation, which is included in the information processing system operations that have been described with reference to FIGS. 1 to 5, will be described in detail below.

Figure 6:
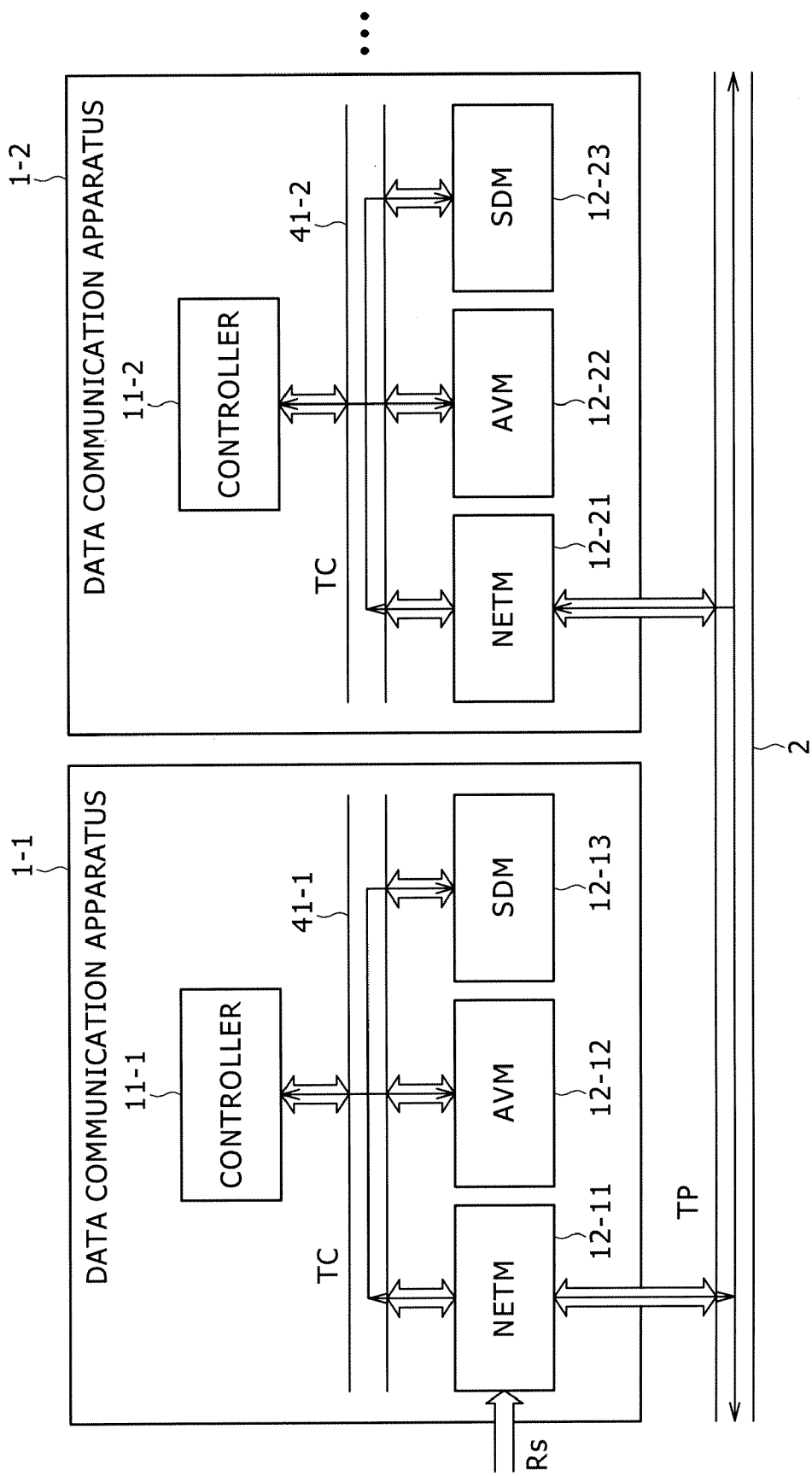
FIG. 6 illustrates how a timing synchronization operation is performed in the information processing system shown in FIG. 1.

FIG. 6 shows an example illustrating how the timing synchronization operation is performed.

The example in FIG. 6 merely shows a data communication apparatus 1-1 that functions as a timing master and a data communication apparatus 1-2 that functions as a timing slave although the information processing system shown in FIG. 1 includes the data communication apparatuses 1-1 to 1-6. The data communication apparatuses 1-3 to 1-6 are not shown because they also function as a timing slave and perform the same operation as the data communication apparatus 1-2.

The data communication apparatuses 1-1 and 1-2 both function as a so-called AV recording/reproduction apparatus because they include the AVM 12-12 or 12-22 or the SDM 12-13 or 12-23. In this instance, it is assumed that these AV recording/reproduction apparatuses require synchronization between the modules and operate with reference timing based, for instance, on video frame synchronization or field synchronization. In other words, it is assumed that a video frame synchronization signal or field synchronization signal enters the NETM 12-11 in the data communication apparatus 1-1 as a timing signal Rs.

In the above situation, the data communication apparatus 1-1 that functions as the timing master operates as described below.

Each time an external timing signal Rs is input, the NETM 12-11 generates a timing packet TP and timing command TC in accordance with the timing signal Rs. The NETM 12-11 then simultaneously transmits the timing packet TP to the other data communication apparatuses 1-2 to 1-6 (only the data communication apparatus 1-2 is shown in the example in FIG. 6), which function as a timing slave, via the LAN-SW 2 by multicast, broadcast, or other similar communication. Further, the NETM 12-11 issues the timing command TC to the controller 11-1, AVM 12-12, and SDM 12-13 in the local apparatus 1-1 via the general-purpose system bus 41-1.

Meanwhile, the data communication apparatus 1-2 that functions as a timing slave operates as described below.

Each time a timing packet TP is transmitted from the data communication apparatus 1-1, the NETM 12-21 receives the timing packet TP via the LAN-SW 2, and generates a timing command TC in accordance with the timing packet TP. The NETM 12-21 then issues the timing command TC to the controller 11-2, AVM 12-22, and SDM 12-23 in the local apparatus 1-2 via the general-purpose system bus 41-2.

The data communication apparatuses 1-3 to 1-6, which are not shown but operate as a timing slave, perform the same operation as the data communication apparatus 1-2.

When the above operations of the timing master and timing slave are combined, all the apparatuses (data communication apparatuses 1-1 to 1-6) connected to a network (LAN-SW 2 in the present embodiment) operate with the same reference timing, including the modules (controller 11 and modules 12 in the present embodiment) connected to the general-purpose system bus (PCI Express bus in the present embodiment) within each apparatus.

Figure 7:
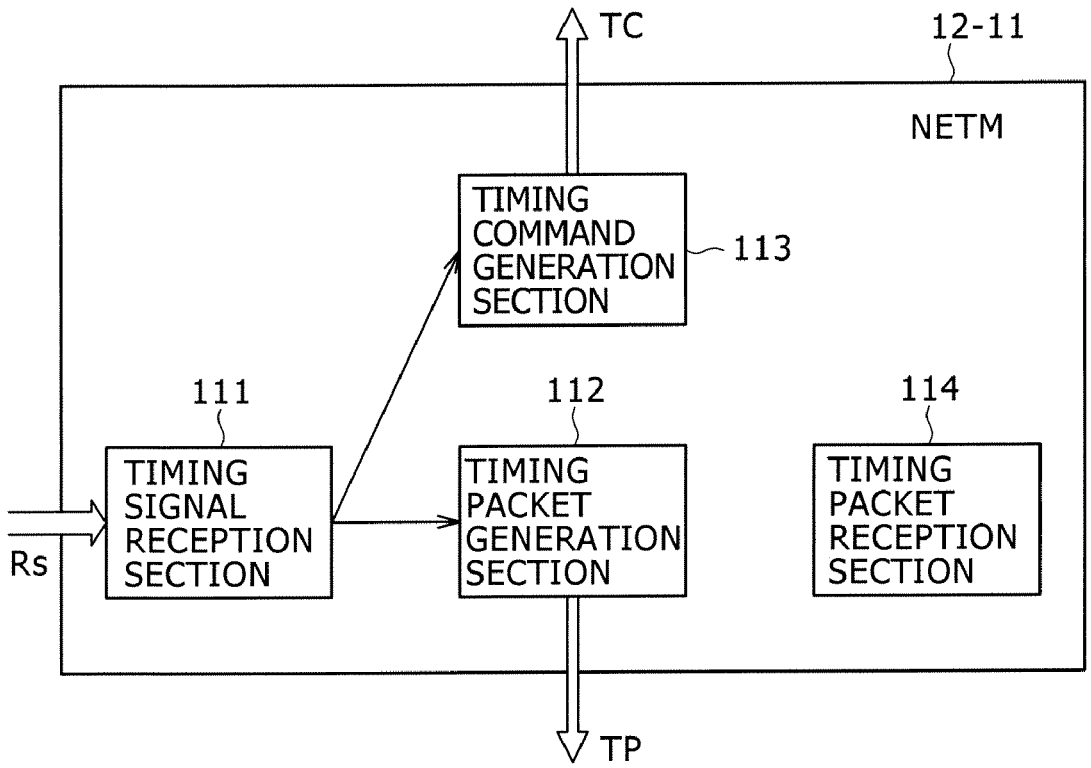
FIG. 7 is a functional block diagram illustrating a typical functional configuration of an NETM in a data communication apparatus that functions as a timing master as indicated in FIG. 6.
Figure 8:
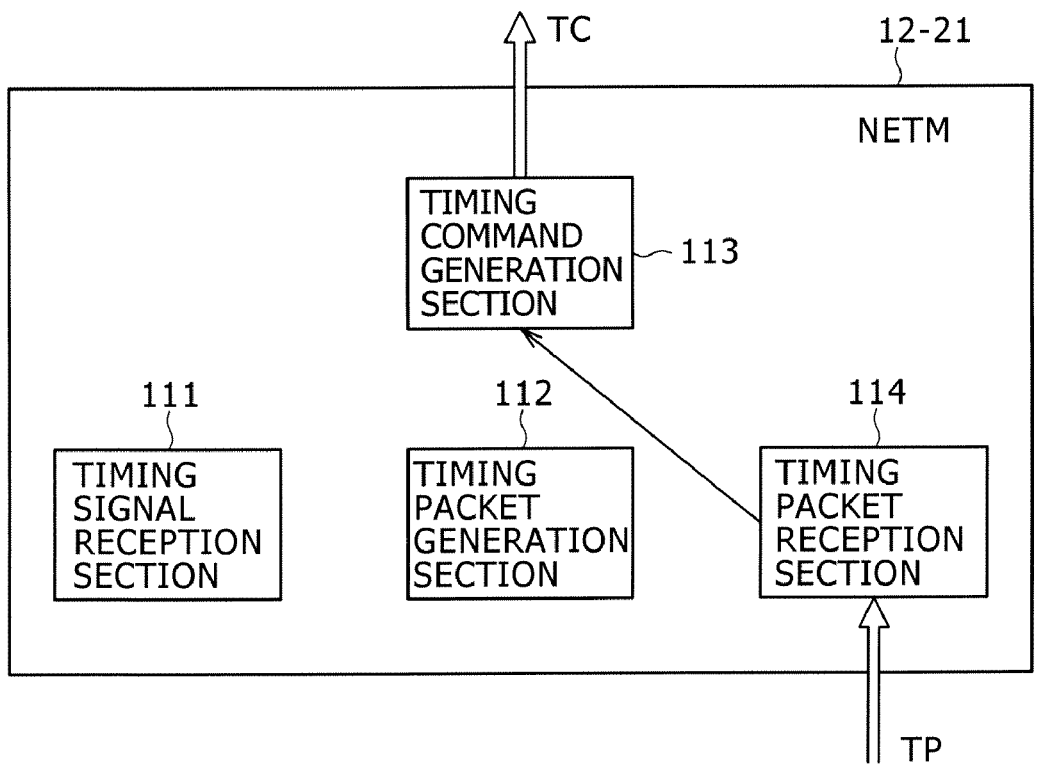
FIG. 8 is a functional block diagram illustrating a typical functional configuration of an NETM in a data communication apparatus that functions as a timing slave as indicated in FIG. 6.

FIG. 7 shows a typical functional configuration of the NETM that provides the timing master operation described above, that is, the NETM 12-11 for the data communication apparatus 1-1 in the example in FIG. 6. FIG. 8 shows a typical functional configuration of the NETM that provides the timing slave operation described above, that is, the NETM 12-21 for the data communication apparatus 1-2 in the example in FIG. 6.

The NETM 12-11 in the example shown in FIG. 7 includes a timing signal reception section 111, a timing packet generation section 112, and a timing command generation section 113. A timing packet reception section 114 is additionally included for a case where the data communication apparatus 1-1 functions as a timing slave. The timing packet reception section 114 remains inoperative as far as the data communication apparatus 1-1 functions as a timing master.

On the other hand, the NETM 12-21 in the example shown in FIG. 8 includes the timing packet reception section 114 and timing command generation section 113. The timing signal reception section 111 and timing packet generation section 112 are additionally included for a case where the data communication apparatus 1-2 functions as a timing master. The timing signal reception section 111 and timing packet generation section 112 remain inoperative as far as the data communication apparatus 1-2 functions as a timing slave.

In the examples shown in FIGS. 7 and 8, the timing signal reception section 111 receives an external timing signal Rs and supplies it to the timing command generation section 113 and timing packet generation section 112.

The timing packet generation section 112 generates a timing packet TP in accordance with the timing signal Rs fed from the timing signal reception section 111, and simultaneously transmits the timing packet TP to the other data communication apparatuses 1-2 to 1-6 (only the data communication apparatus 1-2 is shown in the example in FIG. 6), which function as a timing slave, via the LAN-SW 2 by multicast, broadcast, or other similar communication.

The timing command generation section 113 generates a timing command TC in accordance with the timing signal Rs fed from the timing signal reception section 111 while the local apparatus functions as a timing master (as indicated by the example in FIG. 7) or in accordance with the timing packet TP fed from the timing packet reception section 114 while the local apparatus functions as a timing slave (as indicated by the example in FIG. 8). The timing command generation section 113 then issues the timing command TC to the modules (controller included) in the local apparatus via the general-purpose system bus 41 such as a PCI Express bus.

To generate the timing command TC in accordance with the timing packet TP is to convert the format of the synchronization time information from the timing packet TP to the timing command TC.

Each time a timing packet TP is transmitted from the timing master (data communication apparatus 1-1 in the example in FIG. 6), the timing packet reception section 114 receives the timing packet and supplies it to the timing command generation section 113.

Figure 9:
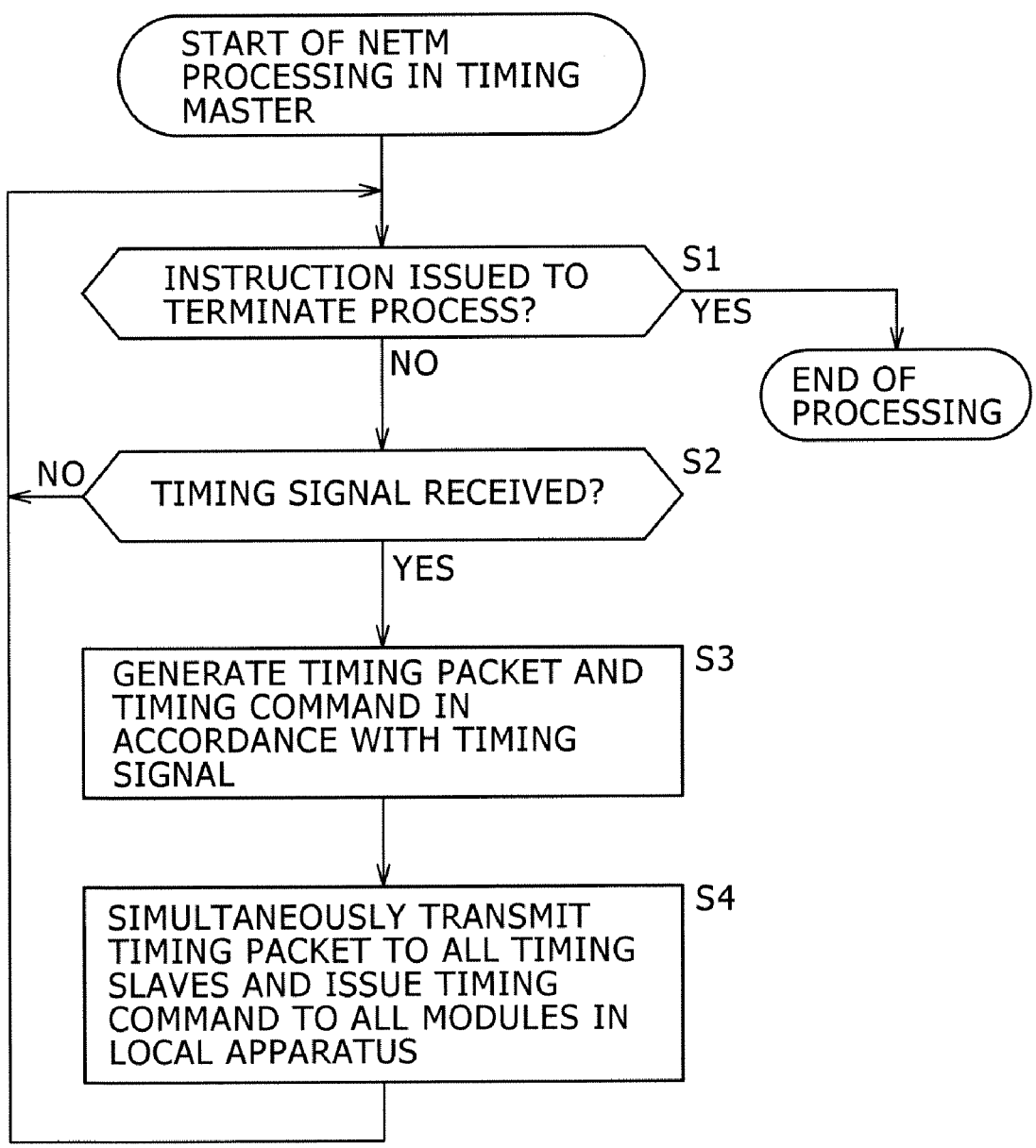
FIG. 9 is a flowchart illustrating an example of a process that the NETM shown in FIG. 7 performs in a timing master.

FIG. 9 is a flowchart illustrating an example of a process that is performed by the NETM 12-11 in the example in FIG. 7 that is, by the NETM 12-11 in the timing master.

In step S1, which is shown in FIG. 9, the NETM 12-11 judges whether an instruction has been issued to terminate a process.

If, for instance, the data communication apparatus 1-1 is turned off, the NETM 12-11 judges in step S1 that an instruction is issued to terminate the process. Therefore, the process performed by the NETM 12-11 in the timing master comes to an end.

If, on the other hand, the judgment result obtained in step S1 indicates that no instruction is issued to terminate the process, processing proceeds to step S2. In step S2, the timing signal reception section 111 in the NETM 12-11 judges whether the timing signal Rs is received.

Unless the timing signal Rs is supplied from the outside, the query in step S2 is repeatedly answered "No" so that processing returns to step S1 to repeatedly perform the subsequent step.

When the timing signal Rs is subsequently supplied from the outside, the timing signal reception section 111 receives it and supplies it to the timing packet generation section 112 and timing command generation section 113. The query in step S2 is then answered "Yes" so that processing proceeds to step S3.

In step S3, the timing packet generation section 112 and timing command generation section 113 generate a timing packet TP and timing command TC, respectively, in accordance with the timing signal Rs.

In step S4, the timing packet generation section 112 simultaneously transmits the timing packet TP to the timing slaves (data communication apparatuses 1-2 to 1-6 in the examples in FIG. 1 or 6), and issues the timing command TC to the modules (controller 11-1, AVM 12-12, and SDM 12-13 in the example in FIG. 6) in the local apparatus.

Upon completion of step S4, processing returns to step S1 to repeat the subsequent steps. In other words, steps S2 to S4 are repeatedly performed each time the timing signal Rs is supplied.

The process performed by the NETM 12-11 in the timing master has been described above. FIG. 10 is a flowchart illustrating an example of a process that is performed by the NETM 12-21 in the example in FIG. 8, that is, by the NETM 12-21 in a timing slave.

In step S11, which is shown in FIG. 10, the NETM 12-21 judges whether an instruction has been issued to terminate a process.

If, for instance, the data communication apparatus 1-2 is turned off, the NETM 12-21 judges in step S11 that an instruction is issued to terminate the process. Therefore, the process performed by the NETM 12-21 in the timing slave comes to an end.

If, on the other hand, the judgment result obtained in step S11 indicates that no instruction is issued to terminate the process, processing proceeds to step S12. In step S12, the timing packet reception section 114 in the NETM 12-21 judges whether a timing packet TP is received.

Unless the timing packet TP is supplied from the timing master, the query in step S12 is repeatedly answered "No" so that processing returns to step S11 to repeatedly perform the subsequent step.

When the timing packet TP is subsequently supplied from the timing master, that is, when step S4, which is shown in FIG. 9, is performed, the timing packet reception section 114 receives the timing packet TP and supplies it to the timing command generation section 113. The query in step S12 is then answered "Yes" so that processing proceeds to step S13.

In step S13, the timing command generation section 113 generates a timing command TC in accordance with the timing packet TP. In other words, the timing command generation section 113 converts the format of synchronization time information from the timing packet TP to the timing command TC. In step S14, the timing command generation section 113 issues the timing command TC to the modules (controller 11-2, AVM 12-22, and SDM 12-23 in the example in FIG. 6) in the local apparatus.

Upon completion of step S14, processing returns to step S11 to repeat the subsequent steps. In other words, steps S12 to S14 are repeatedly performed each time the timing packet TP is supplied.

A series of processes described above (or some of such processes) can be performed not only by hardware but also by software.

When the series of processes is to be performed by software, the programs constituting the software are installed from a network or recording medium onto a computer built in dedicated hardware or a general-purpose personal computer or other computer that can execute various functions when various programs are installed.

The recording medium containing the above-mentioned programs is not only a package medium such as a magnetic disk (floppy disk included), an optical disk (CD-ROM (Compact Disk Read-Only Memory)), a DVD (Digital Versatile Disk), a magnetooptical disk (MD (Mini-Disk) included), a semiconductor memory, or the like, which records the programs and is distributed separately from the apparatus main body to supply the programs to the user, but also the ROM 72 in FIG. 3, the ROM 82 in FIG. 4, or a hard disk contained in the storage section 78 in FIG. 3 or in the recording section 85 in FIG. 4, which records the programs and is built in the apparatus main body before being supplied to the user.

The programs recorded on the package medium are read by the SDM 12-3 in FIG. 2 or the like, and installed as occasion demands on the storage section 78 in FIG. 3, the recording section 85 in FIG. 4, or the like.

In this document, the steps that describe the programs recorded on the recording medium not only include processes that are performed in a described chronological order but also include processes that are performed parallelly or individually and not necessarily in chronological order.

In this document, the term "system" denotes the whole apparatus that includes a plurality of processing devices and processing sections.

While the preferred embodiment of the present invention have been described using the specific terms, such description is for illustrative purposes only, and it is to be understood that changes and variations may be made without departing from the spirit or scope of the following claims.

What is claimed is:

1. An information processing system comprising:
a plurality of information processing apparatuses that are connected via a network, each information processing apparatus including a first and second device that are interconnected via a system bus conforming to the Peripheral Component Interconnect (PCI) Express bus standard,
the first device being a network module having a network communication function and the second device including a functional device that performs a predetermined function and connects to the system bus via an interface device that uses a local interface to exchange information with said functional device and uses an interface conforming to said system bus to exchange information with said system bus,
one of the plurality of the information processing apparatuses inputting an external timing signal and functioning as a timing master, and the other information processing apparatuses functioning as timing slaves, wherein
said network module in said timing master
generates time synchronization information in the form of a packet and time synchronization information in the form of a command in accordance with said external timing signal and
transmits said command to the second device connected to said system bus of said timing master and transmits said packet to said timing slaves via said network,
each said network module in each said timing slave
receives said packet from said timing master,
converts said packet to said command, and
transmits said command to the second device connected to said system bus of said respective timing slave, and
each said interface device includes a message bus target section that communicates over a message bus of said local interface using a first format conforming to said message bus, a data bus access section that communicates over a data bus of said local interface using a second format conforming to said data bus different than the first format, and a system bus converter that converts messages written to said message bus target section and data written to said data bus access section to at least one transaction layer packet conforming to the Peripheral Component Interconnect (PCI) Express bus standard to said system bus, converts messages received from said system bus to the first format for communication over said message bus, and converts data received from said system bus to the second format for communication over said data bus, wherein the message bus of said local interface is supplied with an interrupt signal received from an interrupt line to instruct the functional device to read from the message bus.

2. The information processing system according to claim 1, wherein
for said second device that receives said command transmitted by said network module, said command is communicated to said functional device of said another module via said message bus.

3. An information processing method for use in an information processing system that includes a plurality of information processing apparatuses, which are connected via a network, wherein
each information processing apparatus includes a first and second device that are interconnected via a system bus conforming to the Peripheral Component Interconnect (PCI) Express bus standard,
the first device being a network module having a network communication function and the second device including a functional device that performs a predetermined function and connects to the system bus via an interface device that uses a local interface to exchange information with said functional device and uses an interface conforming to said system bus to exchange information with said system bus,
one of the plurality of the information processing apparatuses inputting an external timing signal and functioning as a timing master, and the other information processing apparatuses functioning as timing slaves, and
each said interface device includes a message bus target section that communicates over a message bus of said local interface using a first format conforming to said message bus, a data bus access section that communicates over a data bus of said local interface using a second format conforming to said data bus, and a system bus converter that converts messages written to said message bus target section and messages written to said data bus access section to at least one transaction layer packet conforming to the Peripheral Component Interconnect (PCI) Express bus standard to said system bus, converts messages received from said system bus to the first format for communication over said message bus, and converts data received from said system bus to the second format for communication over said data bus, wherein the message bus of said local interface is supplied with an interrupt signal received from an interrupt line to instruct the functional device to read from the message bus, said information processing method comprising the steps of:

causing said network module in said timing master to
generate time synchronization information in the form of a packet and time synchronization information in the form of a command in accordance with said timing signal,
transmit said command to the second device connected to said system bus of said timing master, and
transmit said packet to said timing slaves via said network; and causing each said network module in each said timing slave to
receive said packet from said timing master,
convert said packet to said command, and
transmit said command to the second device connected to said system bus of said respective timing slave.

4. The information processing method according to claim 3, wherein
for said second device that receives said command transmitted by said network module, said command is communicated to said functional device of said another module via said message bus.

5. An information processing apparatus within an information processing system that includes a plurality of information processing apparatuses, which are connected via a network, said information processing apparatus comprising:
a first and second device that are interconnected via a system bus conforming to the Peripheral Component Interconnect (PCI) Express bus standard,
the first device being a network module having a network communication function and the second device including a functional device that performs a predetermined function and connects to the system bus via an interface device that uses a local interface to exchange information with said functional device and uses an interface conforming to said system bus to exchange information with said system bus,
one of the plurality of the information processing apparatuses inputting an external timing signal and functioning as a timing master, and the other information processing apparatuses functioning as timing slaves, wherein
said network module in said timing master includes
a receiver configured to receive said timing signal,
a packet generator configured to generate time synchronization information in the form of a packet in accordance with said timing signal received by said receiver and transmit said packet to said timing slaves via said network, and
a command generator configured to generate said time synchronization information in the form of a command in accordance with said timing signal received by said receiver and transmit said command to the second device connected to said system bus of said timing master, and each said interface device includes a message bus target section that communicates over a message bus of said local interface using a first format conforming to said message bus, a data bus access section that communicates over a data bus of said local interface using a second format conforming to said data bus different than the first format, and a system bus converter that converts messages written to said message bus target section and messages written to said data bus access section to at least one transaction layer packet conforming to the Peripheral Component Interconnect (PCI) Express bus standard to said system bus, converts messages received from said system bus to the first format for communication over said message bus, and converts data received from said system bus to the second format for communication over said data bus, wherein the message bus of said local interface is supplied with an interrupt signal received from an interrupt line to instruct the functional device to read from the message bus.

6. The information processing apparatus according to claim 5, wherein
said functional device in said network module functions as said receiver, said packet generator, and said command generator.

7. An information processing method for use in an information processing apparatus within an information processing system that includes a plurality of information processing apparatuses, which are connected via a network, wherein
said information processing apparatus includes a first and second device that are interconnected via a system bus conforming to the Peripheral Component Interconnect (PCI) Express bus standard,
the first device being a network module having a network communication function and the second device including a functional device that performs a predetermined function and connects to the system bus via an interface device that uses a local interface to exchange information with said functional device and uses an interface conforming to said system bus to exchange information with said system bus, and
one of the plurality of the information processing apparatuses inputting an external timing signal and functioning as a timing master, and the other information processing apparatuses functioning as timing slaves, and
each said interface device includes a message bus target section that communicates over a message bus of said local interface using a first format conforming to said message bus, a data bus access section that communicates over a data bus of said local interface using a second format conforming to said data bus different than the first format, and a system bus converter that converts messages written to said message bus target section and messages written to said data bus access section to at least one transaction layer packet conforming to the Peripheral Component Interconnect (PCI) Express bus standard to said system bus, converts messages received from said system bus to the first format for communication over said message bus, and converts data received from said system bus to the second format for communication over said data bus, wherein the message bus of said local interface is supplied with an interrupt signal received from an interrupt line to instruct the functional device to read from the message bus, said information processing method for use in an information processing apparatus that functions as said timing master, comprising the steps of:
  causing said network module in said timing master to generate time synchronization information in the form of a packet and time synchronization information in the form of a command in accordance with said timing signal; and
  causing said network module in said timing master to transmit said command to the second device connected to said system bus of said timing master and transmit said packet to said timing slaves via said network.

8. A non-transitory computer readable medium storing a program in an information processing system that includes a plurality of information processing apparatuses, which are connected via a network, wherein
  said information processing apparatus includes a first and second device that are interconnected via a system bus conforming to the Peripheral Component Interconnect (PCI) Express bus standard,
  the first device being a network module having a network communication function and the second device including a functional device that performs a predetermined function and connects to the system bus via an interface device that uses a local interface to exchange information with said functional device and uses an interface conforming to said system bus to exchange information with said system bus,
  one of the plurality of the information processing apparatuses inputting an external timing signal and functioning as a timing master, and the other information processing apparatuses functioning as timing slaves, and
  each said interface device includes a message bus target section that communicates over a message bus of said local interface using a first format conforming to said message bus, a data bus access section that communicates over a data bus of said local interface using a second format conforming to said data bus different than the first format, and a system bus converter that converts messages written to said message bus target section and messages written to said data bus access section to at least one transaction layer packet conforming to the Peripheral Component Interconnect (PCI) Express bus standard to said system bus, converts messages received from said system bus to the first format for communication over said message bus, and converts data received from said system bus to the second format for communication over said data bus, wherein the message bus of said local interface is supplied with an interrupt signal received from an interrupt line to instruct the functional device to read from the message bus, said program, when executed by a computer controlling said information processing apparatus that functions as said timing master, directing the computer to execute the steps of:
  causing said network module in said timing master to generate time synchronization information in the form of a packet and time synchronization information in the form of a command in accordance with said timing signal; and
  causing said network module in said timing master to transmit said command to the second device connected to said system bus of said timing master and transmit said packet to said timing slaves via said network.

9. The information processing system according to claim 8, wherein
  for said second device that receives said command transmitted by said network module, said command is communicated to said functional device of said another module via said message bus.

10. An information processing apparatus within an information processing system that includes a plurality of information processing apparatuses, which are connected via a network, said information processing apparatus comprising:
  a first and second device that are interconnected via a system bus conforming to the Peripheral Component Interconnect (PCI) Express bus standard,
  the first device being a network module having a network communication function and the second device including a functional device that performs a predetermined function and connects to the system bus via an interface device that uses a local interface to exchange information with said functional device and uses an interface conforming to said system bus to exchange information with said system bus,
  one of the plurality of the information processing apparatuses generating time synchronization information in the form of a packet in accordance with an external timing signal and transmitting the generated packet to said network functioning as a timing master, and the other information processing apparatuses functioning as timing slaves, wherein
  said network module in said timing slaves includes
    a receiver configured to receive said packet from said timing master via said network and
    a command generator configured to convert said packet received by said receiver to said command and transmit said command to the second device connected to said system bus of said timing slave, and
  each said interface device includes a message bus target section that communicates over a message bus of said local interface using a first format conforming to said message bus, a data bus access section that communicates over a data bus of said local interface using a second format conforming to said data bus different than the first format, and a system bus converter that converts messages written to said message bus target section and messages written to said data bus access section to at least one transaction layer packet conforming to the Peripheral Component Interconnect (PCI) Express bus standard to said system bus, converts messages received from said system bus to the first format for communication over said message bus, and converts data received from said system bus to the second format for communication over said data bus, wherein the message bus of said local interface is supplied with an interrupt signal received from an interrupt line to instruct the functional device to read from the message bus.

11. The information processing apparatus according to claim 10, wherein
  said functional device in said network module functions as said receiver and said Command generator.

12. An information processing method for use in an information processing apparatus within an information processing system that includes a plurality of information processing apparatuses, which are connected via a network, wherein
  said information processing apparatus includes a first and second device that are interconnected via a system bus conforming to the Peripheral Component Interconnect (PCI) Express bus standard,
  the first device being a network module having a network communication function and the second device including a functional device that performs a predetermined function and connects to the system bus via an interface device that uses a local interface to exchange information with said functional device and uses an interface conforming to said system bus to exchange information with said system bus, one of the plurality of the information processing apparatuses generating time synchronization information in the form of a packet in accordance with an external timing signal and transmitting the generated packet to said network functioning as a timing master, and the other information processing apparatuses functioning as timing slaves, and each said interface device includes a message bus target section that communicates over a message bus of said local interface using a first format conforming to said message bus, a data bus access section that communicates over a data bus of said local interface using a second format conforming to said data bus different than the first format, and a system bus converter that converts messages written to said message bus target section and messages written to said data bus access section to at least one transaction layer packet conforming to the Peripheral Component Interconnect (PCI) Express bus standard to said system bus, converts messages received from said system bus to the first format for communication over said message bus, and converts data received from said system bus to the second format for communication over said data bus, wherein the message bus of said local interface is supplied with an interrupt signal received from an interrupt line to instruct the functional device to read from the message bus, said information processing method for use in an information processing apparatus that functions as one of said timing slaves, comprising the steps of:

causing said network module in said timing slave to receive said packet from said timing master via said network;

causing said network module in said timing slave to convert said packet to said command; and causing said network module in said timing slave to transmit said command to the second device connected to said system bus of said timing slave.

13. A non-transitory computer readable medium storing a program in an information processing apparatus within an information processing system that includes a plurality of information processing apparatuses, which are connected via a network, wherein said information processing apparatus includes a first and second device that are interconnected via a system bus conforming to the Peripheral Component Interconnect (PCI) Express bus standard, the first device being a network module having a network communication function and the second device including a functional device that performs a predetermined function and connects to the system bus via an interface device that uses a local interface to exchange information with said functional device and uses an interface conforming to said system bus to exchange information with said system bus, one of the plurality of the information processing apparatuses generating time synchronization information in the form of a packet in accordance with an external timing signal and transmitting the generated packet to said network functioning as a timing master, and the other information processing apparatuses functioning as timing slaves, and each said interface device includes a message bus target section that communicates over a message bus of said local interface using a first format conforming to said message bus, a data bus access section that communicates over a data bus of said local interface using a second format conforming to said data bus different than the first format, and a system bus converter that converts messages written to said message bus target section and messages written to said data bus access section to at least one transaction layer packet conforming to the Peripheral Component Interconnect (PCI) Express bus standard to said system bus, converts messages received from said system bus to the first format for communication over said message bus, and converts data received from said system bus to the second format for communication over said data bus, wherein the message bus of said local interface is supplied with an interrupt signal received from an interrupt line to instruct the functional device to read from the message bus, said program, when executed by a computer controlling said information processing apparatus that functions as said timing slave, directing the computer to execute the steps of:

causing said network module in said timing slave to receive said packet from said timing master via said network;

causing said network module in said timing slave to convert said packet to said command; and causing said network module in said timing slave to transmit said command to the second device connected to said system bus of said timing slave.

* * * * *